(12) United States Patent
Cook

(10) Patent No.: US 7,420,343 B2
(45) Date of Patent: Sep. 2, 2008

(54) CURRENT LIMITING DC MOTOR STARTER CIRCUIT

(75) Inventor: Bruce M. Cook, Pittsburgh, PA (US)

(73) Assignee: Westinghouse Electric Co LLC, Pittsburgh, PA (US)

( * ) Notice: Subject to any disclaimer, the term of this patent is extended or adjusted under 35 U.S.C. 154(b) by 164 days.

(21) Appl. No.: 11/512,476

(22) Filed: Aug. 30, 2006

(65) Prior Publication Data

US 2008/0054831 A1    Mar. 6, 2008

(51) Int. Cl.
*H02P 1/04* (2006.01)
(52) U.S. Cl. .................. 318/430; 318/432; 318/434; 318/254
(58) Field of Classification Search .......... 318/430, 318/434, 139, 254, 801, 744; 290/23, 40 F
See application file for complete search history.

(56) References Cited

U.S. PATENT DOCUMENTS

| | | | | |
|---|---|---|---|---|
| 4,145,640 | A | * | 3/1979 | Kipp et al. ............. 318/139 |
| RE30,068 | E | * | 8/1979 | Meyers ................. 318/744 |
| 4,199,711 | A | * | 4/1980 | Horiuchi et al. ........... 318/139 |
| 5,289,560 | A | * | 2/1994 | Abney .................. 388/811 |
| 5,893,432 | A | * | 4/1999 | Nguyen et al. ............ 187/290 |
| 6,188,187 | B1 | * | 2/2001 | Harlan ................ 318/400.04 |
| 6,384,567 | B1 | * | 5/2002 | Maeda .................. 318/801 |
| 6,420,793 | B1 | * | 7/2002 | Gale et al. ................ 290/34 |
| 6,713,888 | B2 | * | 3/2004 | Kajiura ................. 290/40 F |
| 6,842,669 | B2 | | 1/2005 | Bednar et al. |
| 2002/0074803 | A1 | * | 6/2002 | Kajiura ................. 290/40 F |
| 2004/0150233 | A1 | * | 8/2004 | Kajiura .................. 290/24 |

OTHER PUBLICATIONS

Motto, John William Jr., "Introduction to Solid State Power Electronics", Powerex, Inc., Feb. 1977.
"IGBT Module U-Series Product and Application Brochure", Powerex, Inc., Apr. 1997.

* cited by examiner

*Primary Examiner*—Paul Ip

(57) ABSTRACT

A current limiting DC motor starter employing a closed loop current measurement to provide precise current control that adapts to changing motor conditions, integrated with a solid state reversing motor starter. The motor starter further includes a calibrated overcurrent indication and a control system interface that reduces the likelihood that cable faults and other single failures will cause spurious actuation of the motor.

8 Claims, 11 Drawing Sheets

CURRENT LIMITING DC MOTOR STARTER CIRCUIT

CROSS REFERENCE TO RELATED APPLICATIONS

This application is related to copending applications Ser. Nos. 11/512,916 and 11/512,474 filed concurrently herewith.

BACKGROUND OF THE INVENTION

1. Field of the Invention

This invention relates in general to DC motor starting circuits and more particularly to a DC motor starting circuit with a current limiter.

2. Background Information

When DC motors are used for valve operators, the high starting current can place undue burden on the electrical cables and a battery power source. The current in a DC motor is limited by the self generated electromotive force (EMF) voltage that is proportional to the machine speed. When the motor is first started, the speed and hence the EMF is zero (0), thus allowing the current to rise to the rated value known as the "locked rotor current", which can be up to ten times the name plate current rating of the motor. As the machine accelerates, the EMF increases and the current decreases until a steady equilibrium is achieved depending on the load. FIG. 1 shows the current and speed as a function of time for a typical 15 horsepower motor. The current curve is represented by reference character 10 and the speed curve is represented by reference character 12.

Conventional reduce voltage motor starters limit the current but do not adapt to changing conditions of motor temperature or supply voltage. In a conventional reduced voltage motor starter, additional resistance is included in the circuit to limit the current and is then switched out as the motor accelerates. This may be done as a single step or in multiple steps. The switching may be based on fixed times or on a measurement of the motor speed (actually the EMF developed across the motor). A circuit for implementing this approach is illustrated in FIG. 2A. R and L respectively stand for the resistance and inductance of the motor windings. EMF is the electromotive force developed within the motor. Resistance R1 is greater than R2. In operation the Switch S is sequenced from OFF to R1. Then, after a preselected time interval has passed or motor speed has been achieved the Switch S is sequenced to R2 and then when the motor reaches full speed the Switch S connects directly to the power supply. This approach has several drawbacks. In the switched resistance approach, the current limiting is only provided at initial start up. If the current increases later due to overload conditions, then the current will increase until it is interrupted by an over-temperature protection device, if one is included in the circuit. Furthermore, the resistors must be sized to dissipate a large amount of heat. For example, in the 15 horsepower model used to produce the graphs shown in the figures, the RMS power dissipation of the first stage resister is 6.9 KW. Additionally, once the starting resistances have been chosen, it is difficult to make changes in the field to accommodate the as installed conditions experienced for each specific motor operated valve.

The advent of high power semiconductors allows a switch mode voltage regulator approach employed by the prior art to control the voltage of a DC motor as a means to control the motor's speed, to be adapted to overcome the issues identified above for the conventional reduced current motor starter. This is particularly important for some critical applications such as, advance passive nuclear power plants, where DC motors will be employed for safety grade valve operators because no class 1 E AC power source is available. Because these motors must operate from the 125 VDC power station batteries, it is not possible to increase motor voltage for the larger size motors to decrease the operating current. The advanced reactor Utilities Requirements Document for these passive nuclear power plants requires that the cables connecting the valve operators be sized to carry the full locked rotor current on a continuing basis. This is due, in part to a United States Nuclear Regulatory Commission Regulatory Guide (RG1.106) that requires overcurrent protective devices to be bypassed in the event of a safety actuation of the valves. As mentioned above, conventional relay based motor starters have used reduced voltage means to limit starting current by switching resistors into the circuit upon initial energization This conventional approach has the drawbacks that were mentioned above that need to be overcome.

Accordingly, it is an object of this invention to provide a current limiting DC motor starter that employs a switching mode current regulator in a feedback control loop to limit the motor current to a preset value.

It is a further object of this invention to provide an improved current limiting DC motor starter that integrates a switching mode current regulator with a solid state reversing motor starter.

It is an additional object of this invention to provide a current limiting DC motor starter that employs a switching mode current regulator employing closed loop current measurement to provide precise current control that adapts to changing conditions.

It is the further object of this invention to provide an improved current limiting DC motor starter that provides an overcurrent indication to a control system as well as features to enable its calibration.

Further, it is the object of this invention to provide an improved current limiting DC motor starter having an interface with a control system that is arranged in such a manner that cable faults and other single failures will not cause spurious actuation of the motor.

It is an additional object of this invention to provide such an improved current limiting DC motor starter that is specifically suited for safety grade applications in nuclear power plants.

SUMMARY OF THE INVENTION

This invention accomplishes the foregoing objects by integrating a switching mode current regulator with a solid state reversing motor starter. The switching mode current regulator of this invention uses closed loop current measurements to provide precise current control that adapts to changing conditions. The current limiting DC motor starter provided for herein also provides overcurrent indication to a control system and features to enable its calibration. The interface to the control system is arranged in such a manner that cable faults and other single failures will not cause spurious actuation of the motor.

The switching mode current regulator of this invention includes a source input terminal for connecting a source of DC current and a switch in series with the input terminal. The switch has a switch control circuit operable to open the switch when the current to the switch exceeds a predetermined value and to close the switch when the current downstream of the switch falls below a second predetermined value. A motor output terminal is provided for connecting a motor winding in series with the switch. A diode is placed across the motor winding between the motor winding and the switch; the diode being oriented to block current from the source of DC current connected through the source input terminal, from circulating through the diode. A current sensor monitors the current through the motor winding and provides an output representative thereof to the switch control circuit. In the preferred embodiment the switch is an Insulated Gate Bipolar Transistor and the second predetermined value takes into account the hysteresis in the series circuit.

Preferably, there are three control input terminals to the DC motor starter circuit. The first control input terminal is for activating or deactivating the switching mode current regulator. The second control input terminal connects or disconnects a first polarity of an armature of the motor so that when connected will cause the armature to turn in a first direction. The third control input terminal connects or disconnects a second polarity of the armature of the motor so that when connected will cause the armature to turn in a second direction. The circuit is arranged so that when the motor is not running no voltage is present at the three control input terminals so that spurious signals do not cause inadvertent actuation of the motor.

Desirably the current limiting DC motor starter of this invention further includes an overcurrent protection device that monitors the state of the switch and provides an output to a motor control center when the switch remains in an open state for greater than a first preselected time interval. The overcurrent protection device includes a first timing circuit, a second timing circuit and a comparison circuit. The first timing circuit is triggered every time the switch is opened to provide a first given output for at least a second preselected time interval substantially equal to the time the switch will remain open under a normal startup condition. The first preselected time interval is substantially longer than the second preselected time interval and the second preselected time interval is reset every time the first timing circuit is retriggered. The second timing circuit is triggered when the switch is opened to provide a second given output for the first preselected time interval and is not retriggered by the subsequent openings of the switch until the first preselected time interval has timed out. The comparison circuit monitors the first given output and the second given output and provides a third output to the motor control center when the comparison circuit senses that the second given output is not present when the first given output is detected.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

This invention integrates the concept of a switching mode voltage regulator with a solid state reversing motor starter. The improved switching mode current regulator of this invention employs closed loop current measurement to provide precise current control that adapts to changing conditions. This invention also provides an overcurrent indication to the control system as well as features to enable its calibration. Additionally, the interface to the control system is arranged in such a matter that cable faults and other single failures will not cause spurious actuation of the motor.

Figure 1:
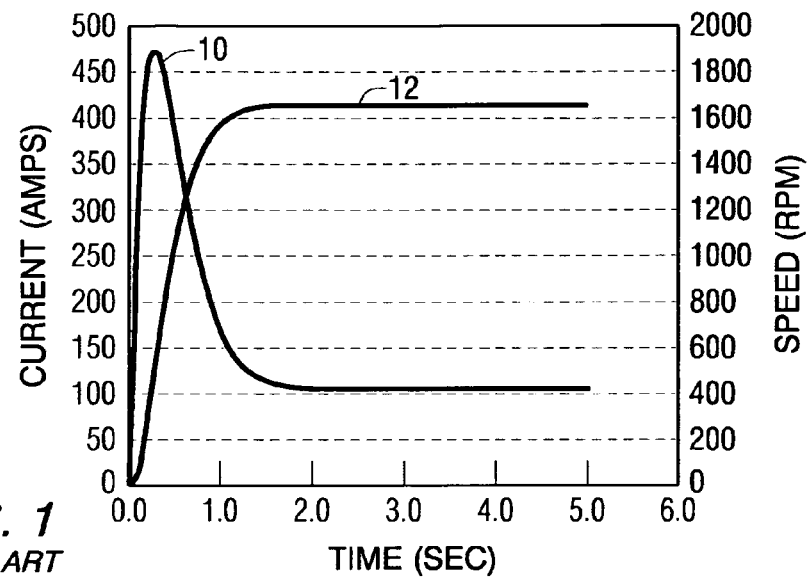
FIG. 1 is a graphical representation of a plot of current and speed versus time of a fifteen (15) horsepower DC motor upon startup.
Figure 2A:
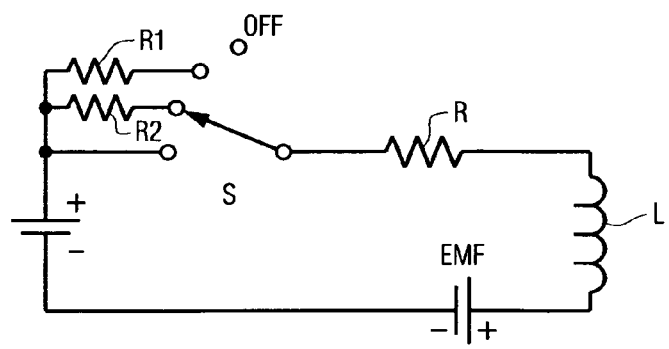
FIG. 2a is a simple schematic circuit diagram of a conventional reduced voltage motor starter to illustrate the concept of adding additional resistance to the motor circuit upon startup until the motor comes up to operational speed.
Figure 2B:
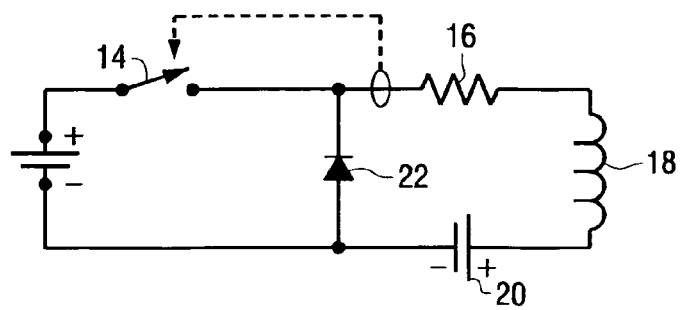
FIG. 2b is a simple schematic circuit diagram of a current regulator to illustrate the switching mode concept of this invention.

The concept of a switching mode current regulator employed by this invention shown in FIG. 2b. To start the motor, the switch 14 is closed. The inductance 18 of the motor initially resists the change in current; however the current does increase with an L/R time constant. When the current reaches the desired limiting value the switch 14 is opened. Current continues to flow through the diode 22 but now decays at the L/R time constant. When the current falls below the set limit by some hysteresis value the switch is again closed. This continues as the motor accelerates which causes the EMF voltage to increase proportionally to the speed. Increasing EMF causes the current to be reduced until it reaches the point where the set limit is not exceeded. After this time the switch remains closed. The result of the current switching mode concept over that illustrated in FIG. 2a can be appreciated from the graphical representation illustrated in FIGS. 3a-6b which plot current and speed of the motor versus time under various motor operating conditions.

Figure 3A:
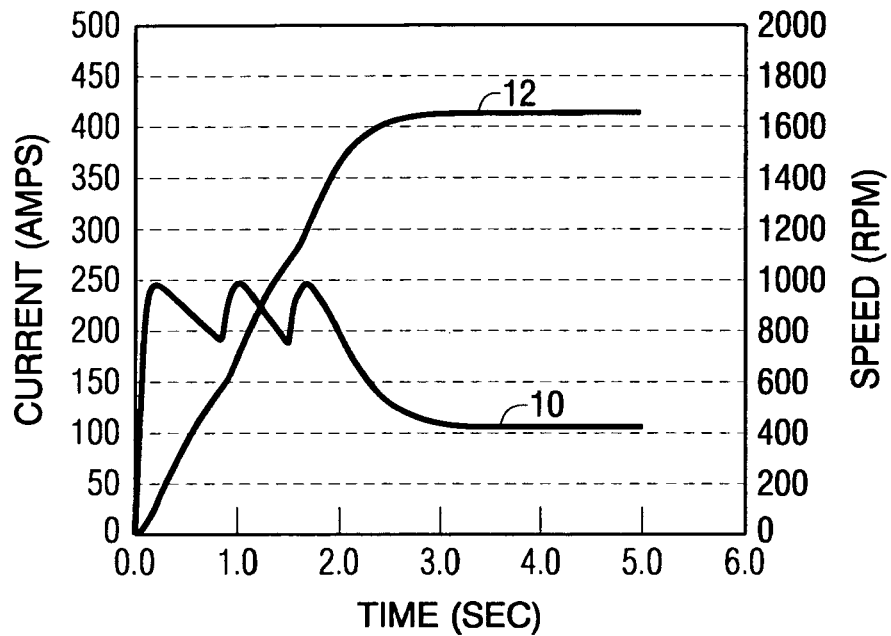
FIGS. 3a and 3b are graphical representations of motor current and speed versus time for both a conventional and a switching mode current regulator, with all design parameters at their nominal values.
Figure 3B:
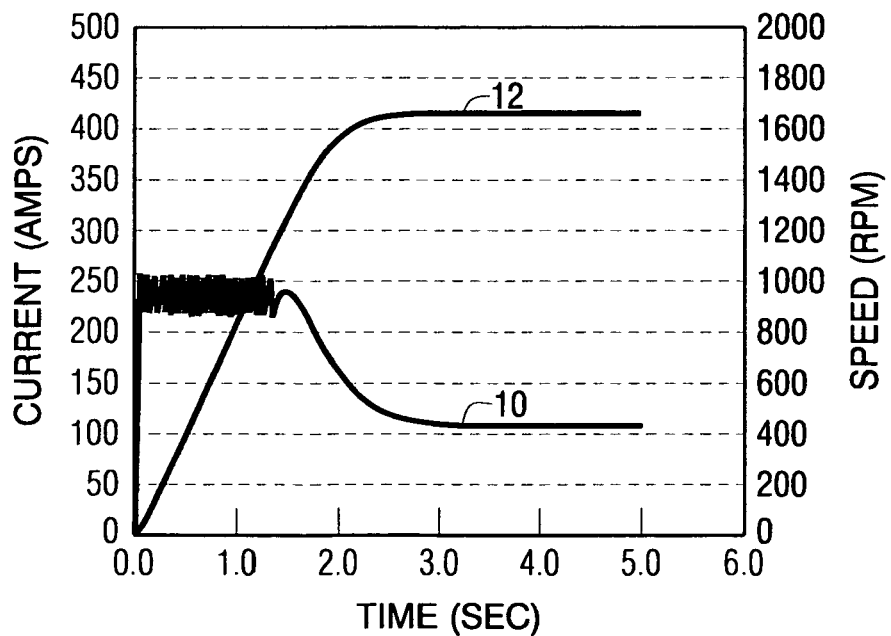

FIGS. 3a and 3b show a comparison between the two different control schemes with all design parameters at their nominal values. The response of the two schemes is similar although the graph of 3b, representative of the switching mode, can be seen to reach full speed a little quicker. This is due to the fact that the current is kept closer to the limiting value during starting. Thus the average starting torque of the motor is higher.

Figure 4A:
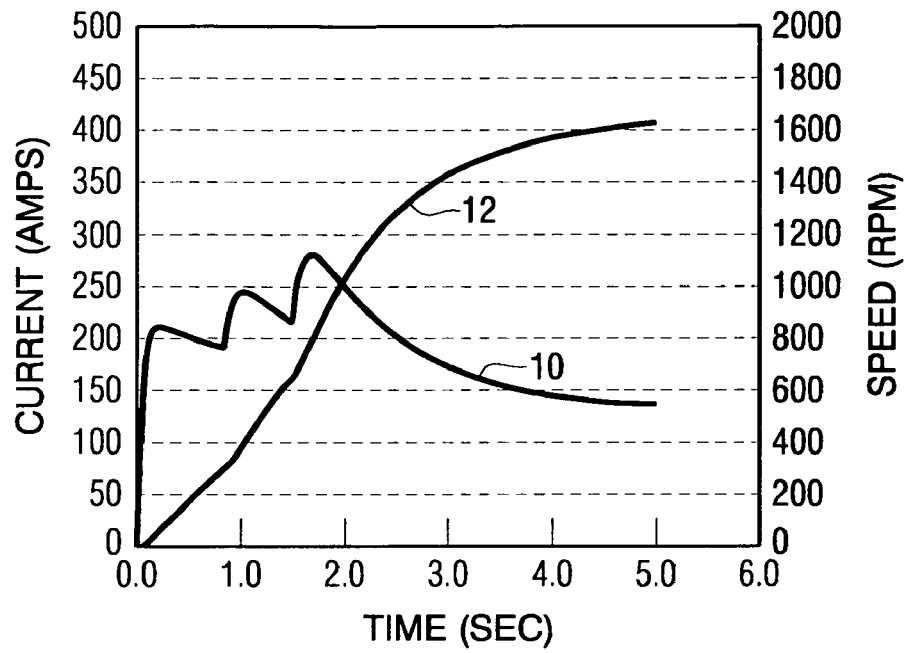
FIGS. 4a and 4b illustrate the comparison shown in FIGS. 3a and 3b with an increase of motor resistance.
Figure 4B:
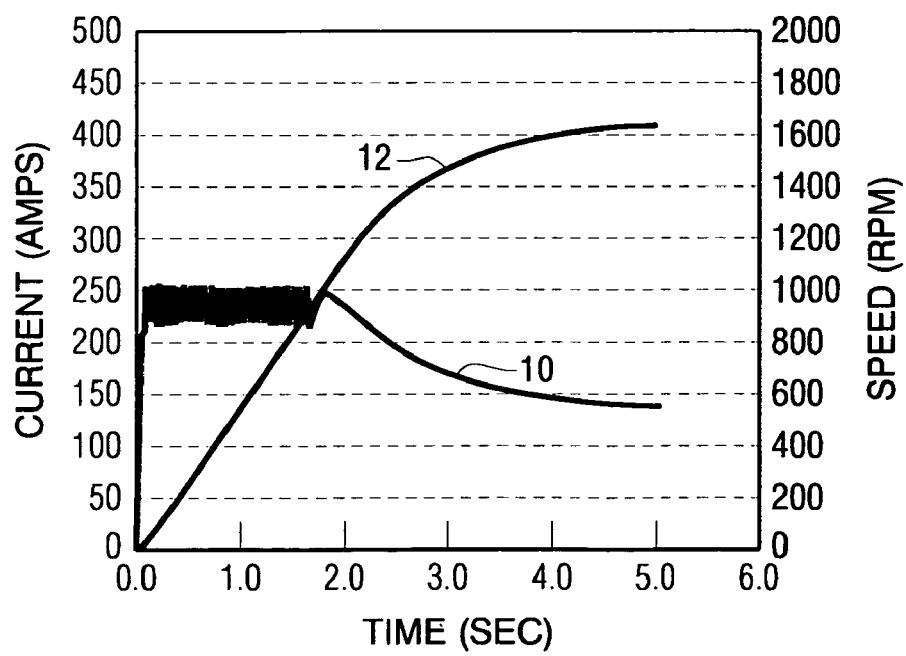

FIGS. 4a and 4b show the effect of increased motor (or circuit) resistance by fifty percent (50%). This increase in resistance may result from higher motor temperature (either from higher ambient temperature or from previous running) or from changes to the circuit such as corrosion of the connections. The nominal resistance of a large DC motor is low, typically a fraction of an ohm. It does not take much of a change to impact the response. Also, the increase in the resistance could be from a more permanent source such as not sufficiently accounting for the resistance of the cable leads. From FIG. 3a it can be seen that the conventional reduced voltage starter initially produces less than the intended current, hence less torque under these conditions resulting in a slower acceleration of the motor. The current limit is exceeded in the later stages of starting because the motor speed, and hence the EMF, is less than planned at the time the resistors are switched out.

Figure 5A:
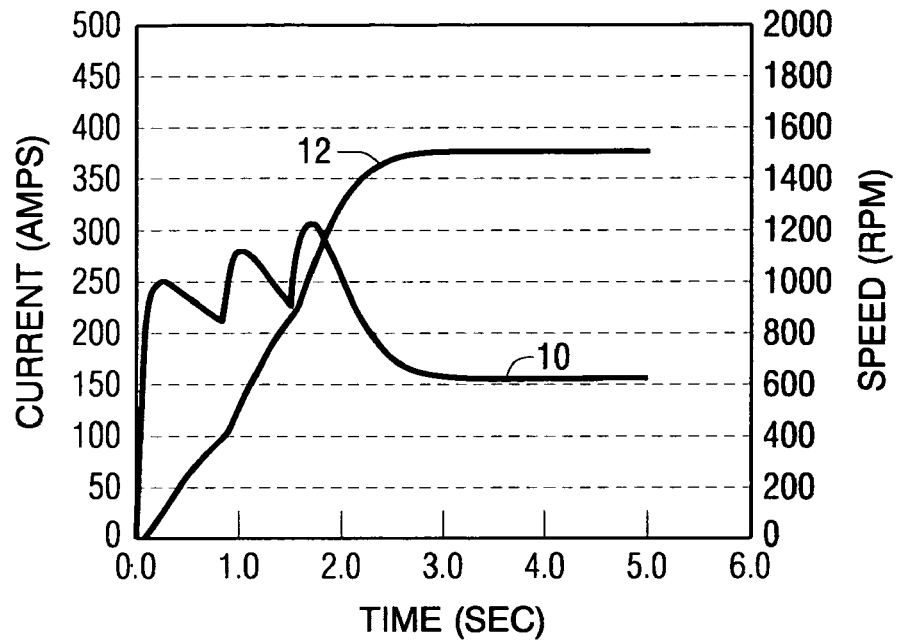
FIGS. 5a and 5b show the comparison of FIGS. 3a and 3b as affected by in increase in load.
Figure 5B:
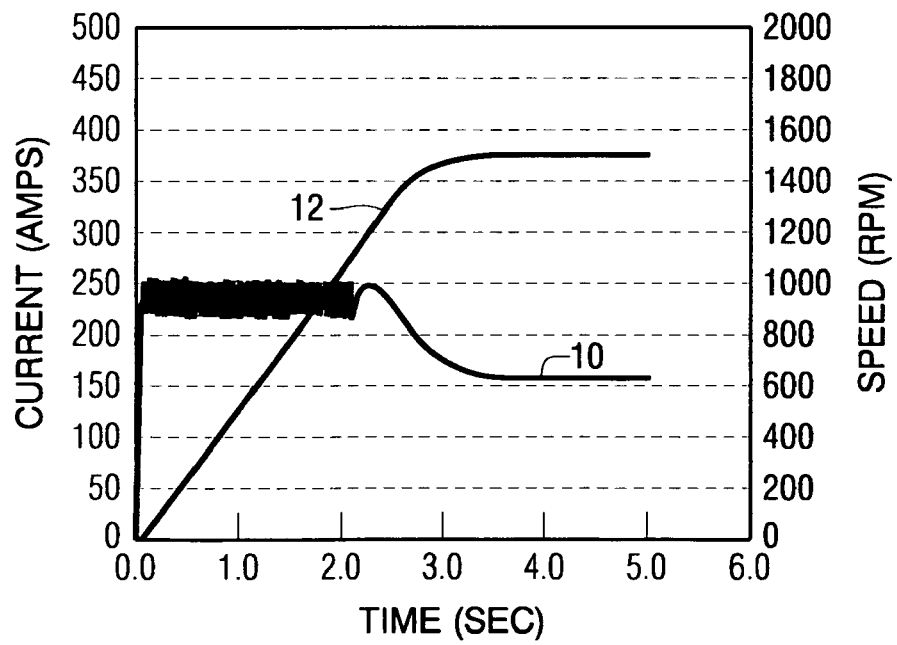

FIGS. 5a and 5b show the effects of another parameter change, that being an increase in load by 50%. Such a load increase may occur in a motor operated valve if the stem packing offers more resistance from over tightening by maintenance to reduce leaks, etc. As can be seen, under these conditions, the conventional motor starter design does not keep the current below the set limit, whereas the one employing feedback control adapts to this situation.

Figure 6A:
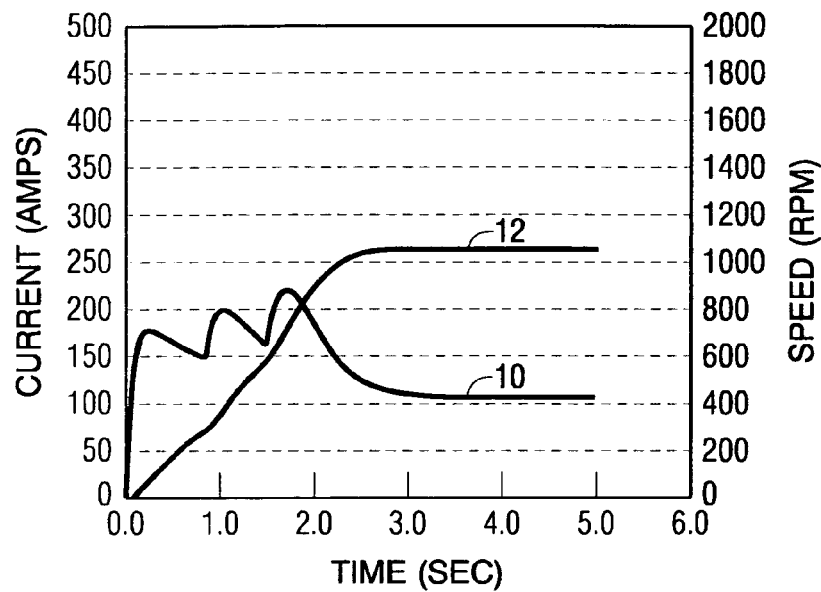
FIGS. 6a and 6b show the comparison illustrated by FIGS. 3a and 3b after a battery voltage drain.
Figure 6B:
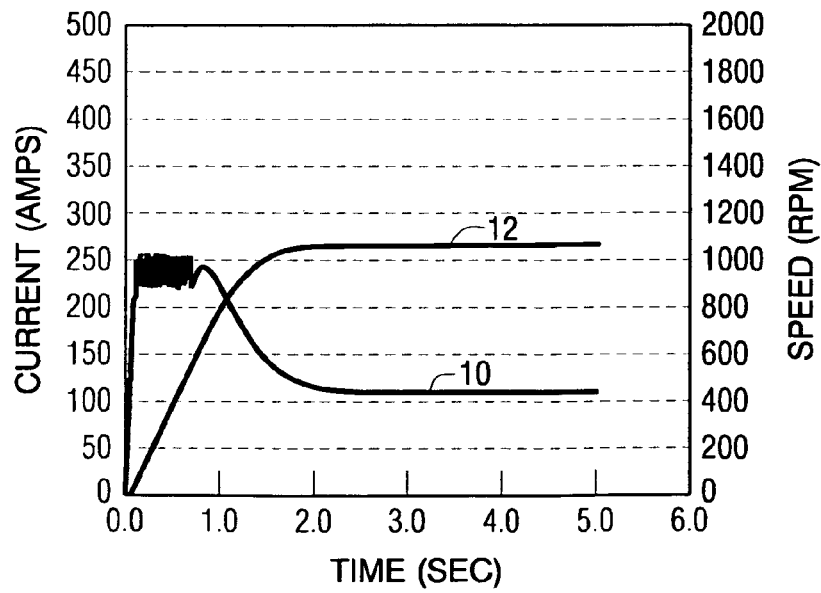

Additionally, in critical safety related applications, such as are found in nuclear power plants, the motor operated valves must be operable even if the battery voltage is reduced because they have been drained from long duration usage. FIGS. 6a and 6b show a comparison of the two control schemes under conditions of 70% supply voltage. It can be seen that the conventional approach does not produce the allowed current during starting thus leading to a lower torque and a slower acceleration of the motor. The control provided by this invention again adapts to the changing parameters providing the best possible torque under all conditions.

Figure 7A:
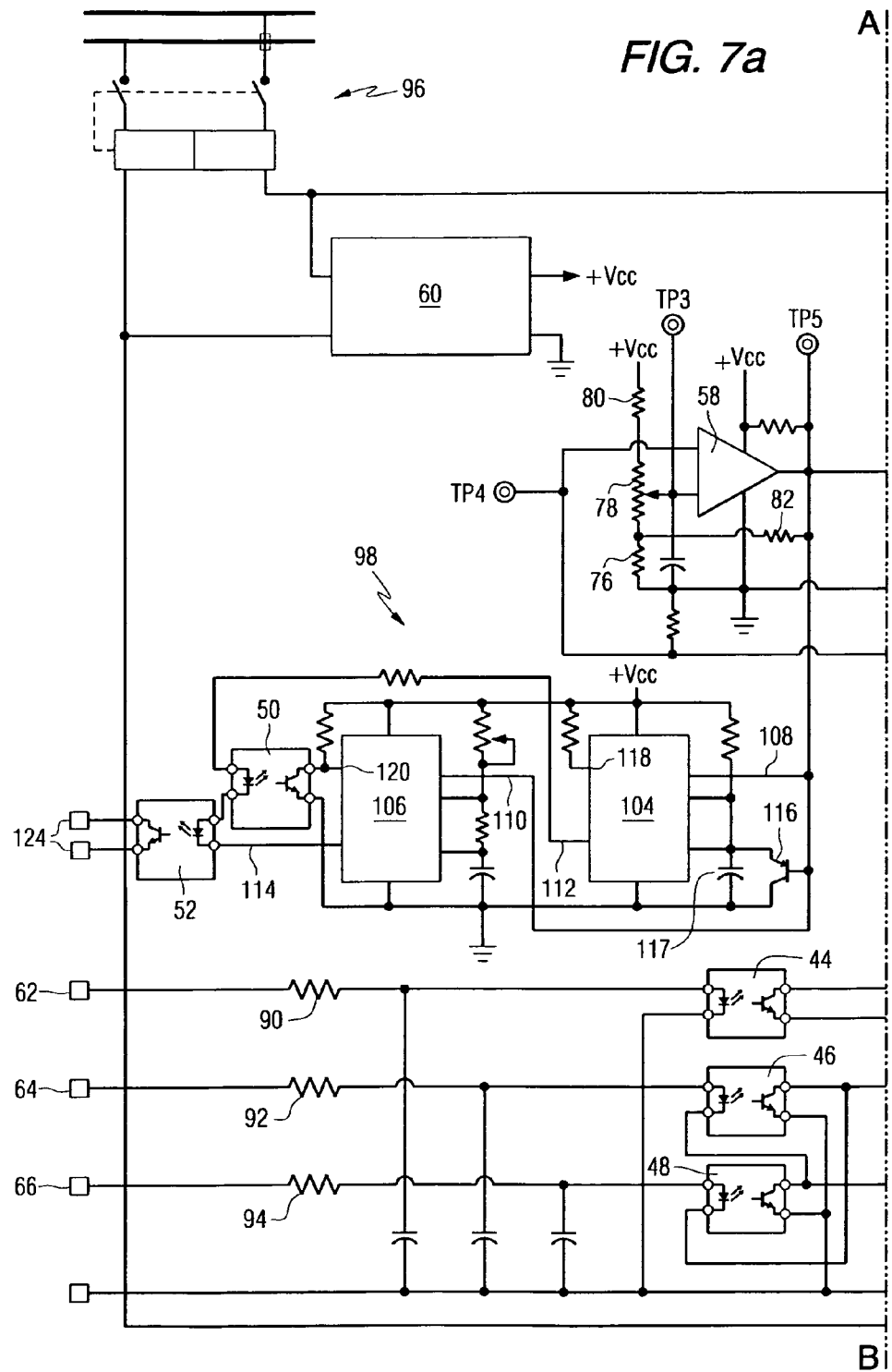
FIGS. 7a, 7b and 7c is a full circuitry schematic of the preferred embodiment of a current limiting motor starter contemplated by this invention.
Figure 7B:
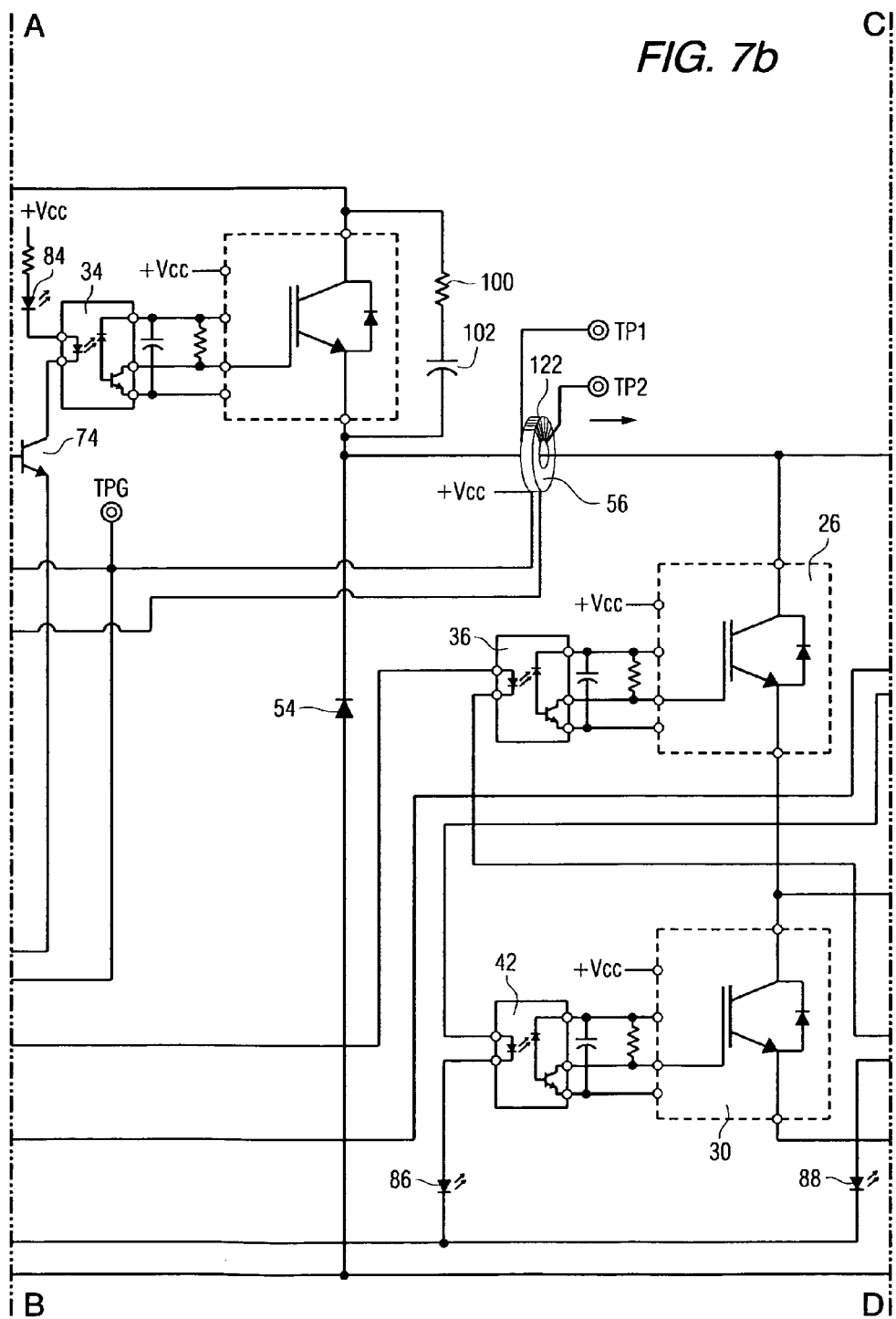
Figure 7C:
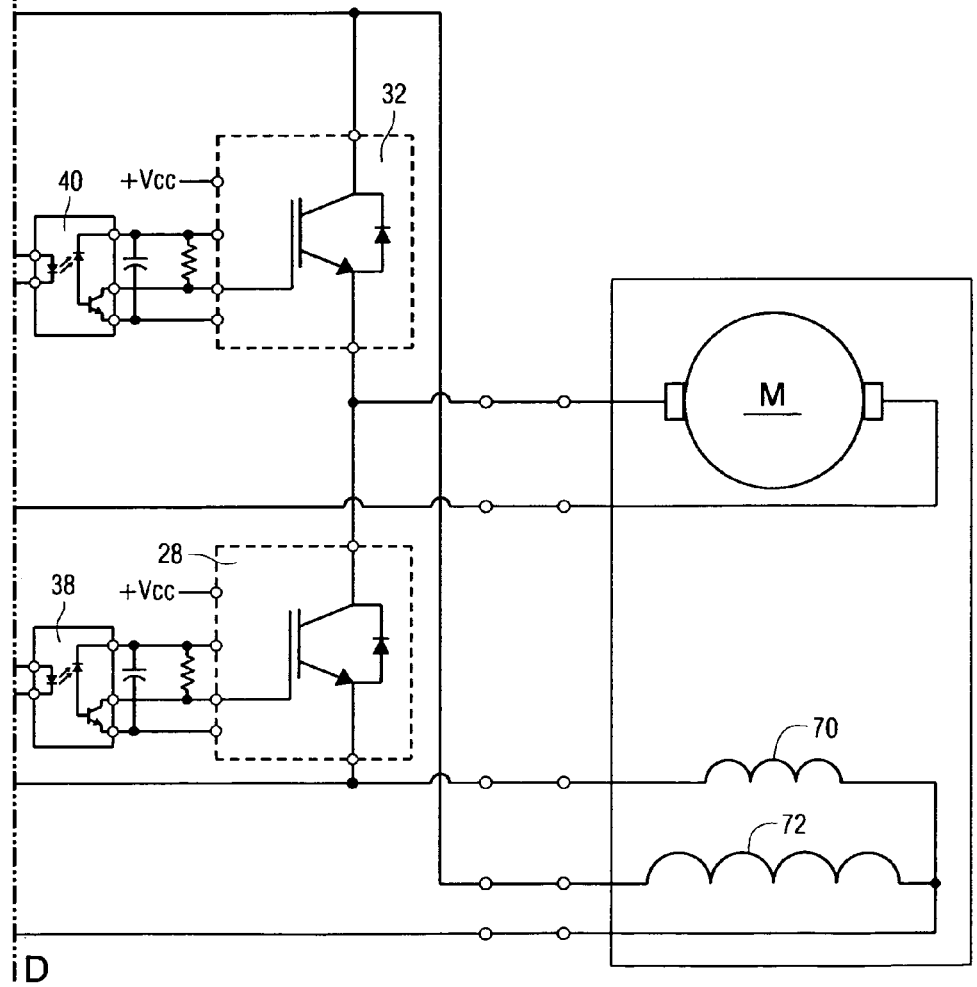
Figure 8A:
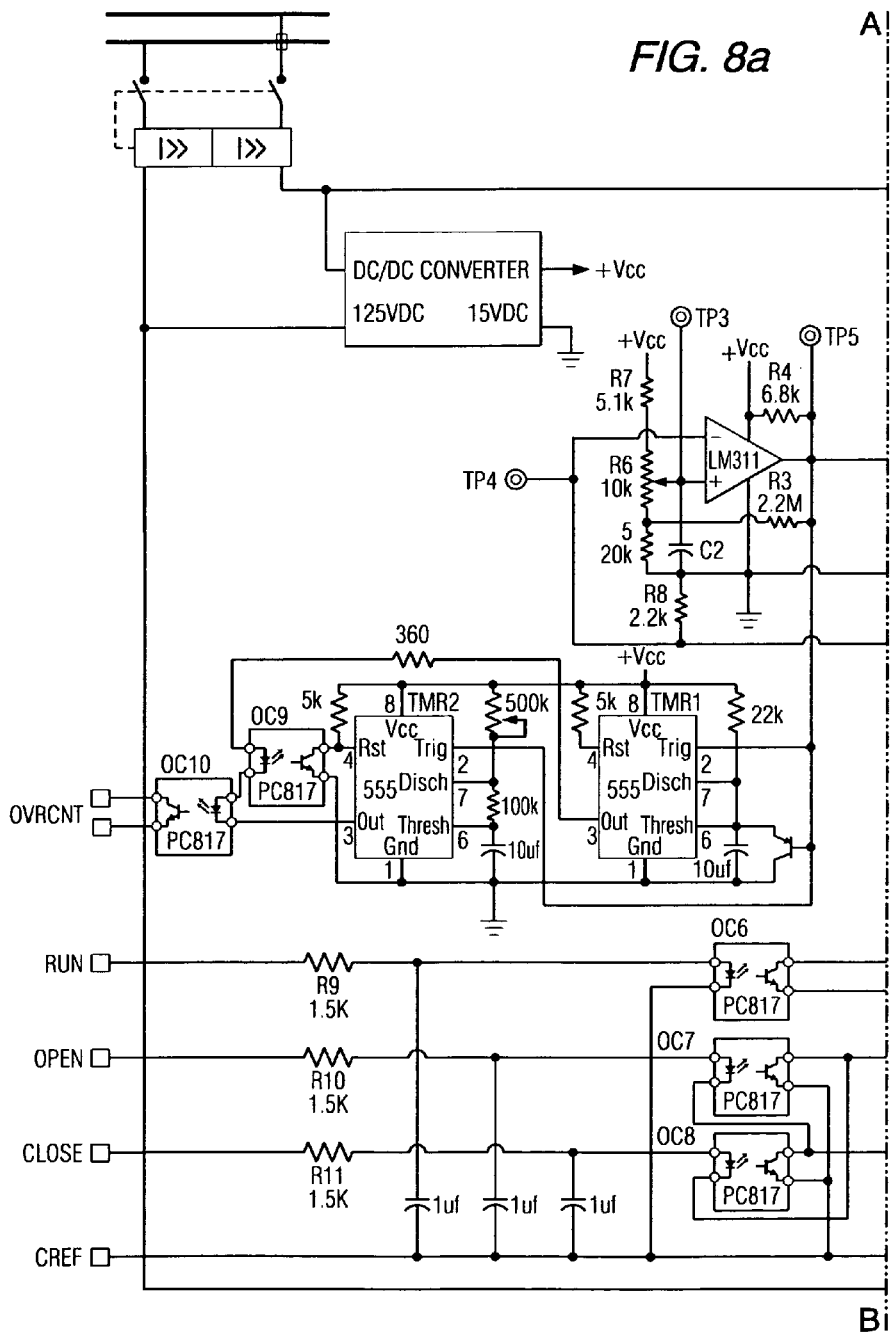
FIGS. 8a, 8b and 8c is the circuit diagram illustrated in FIG. 7 showing component values.
Figure 8B:
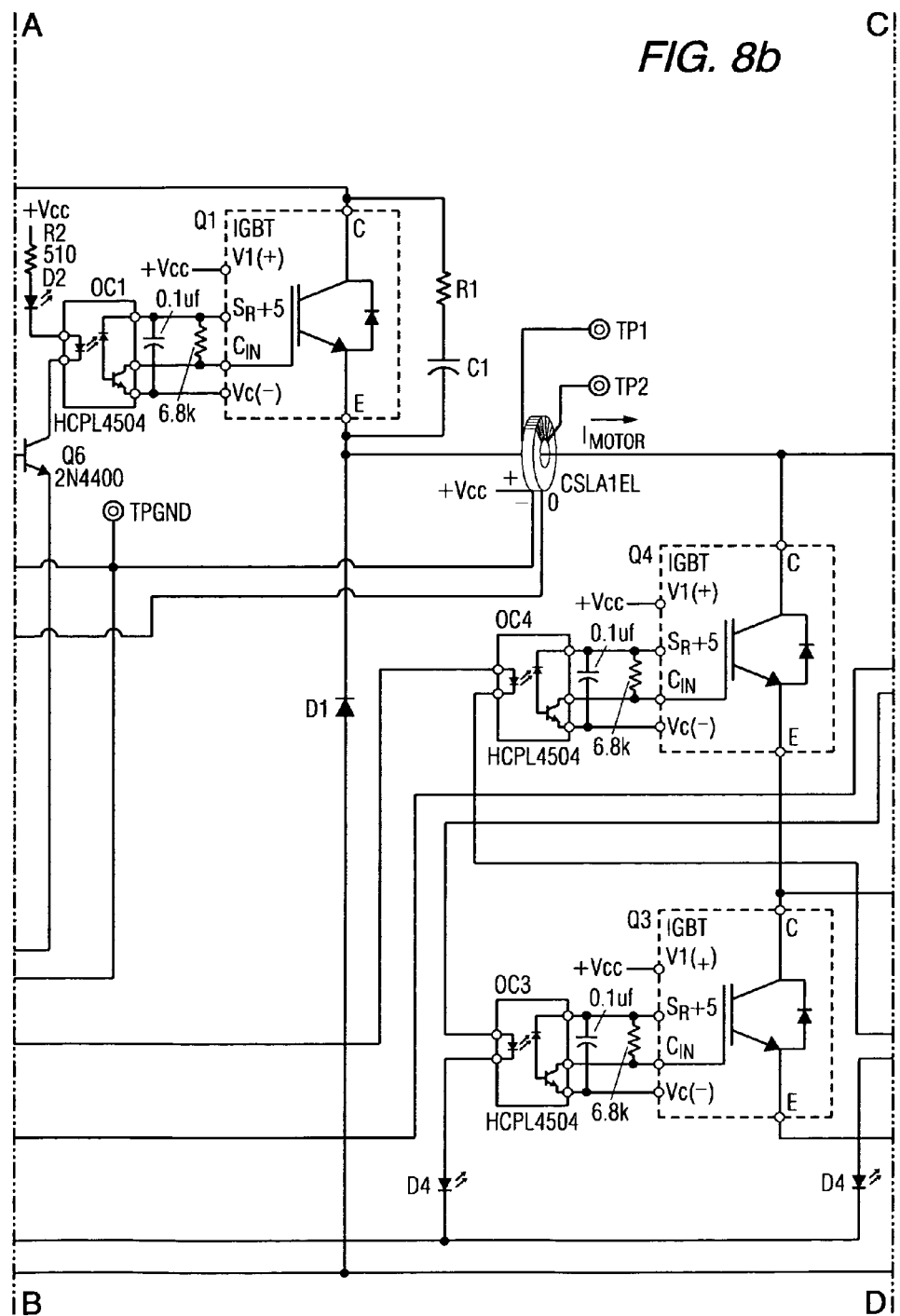
Figure 8C:
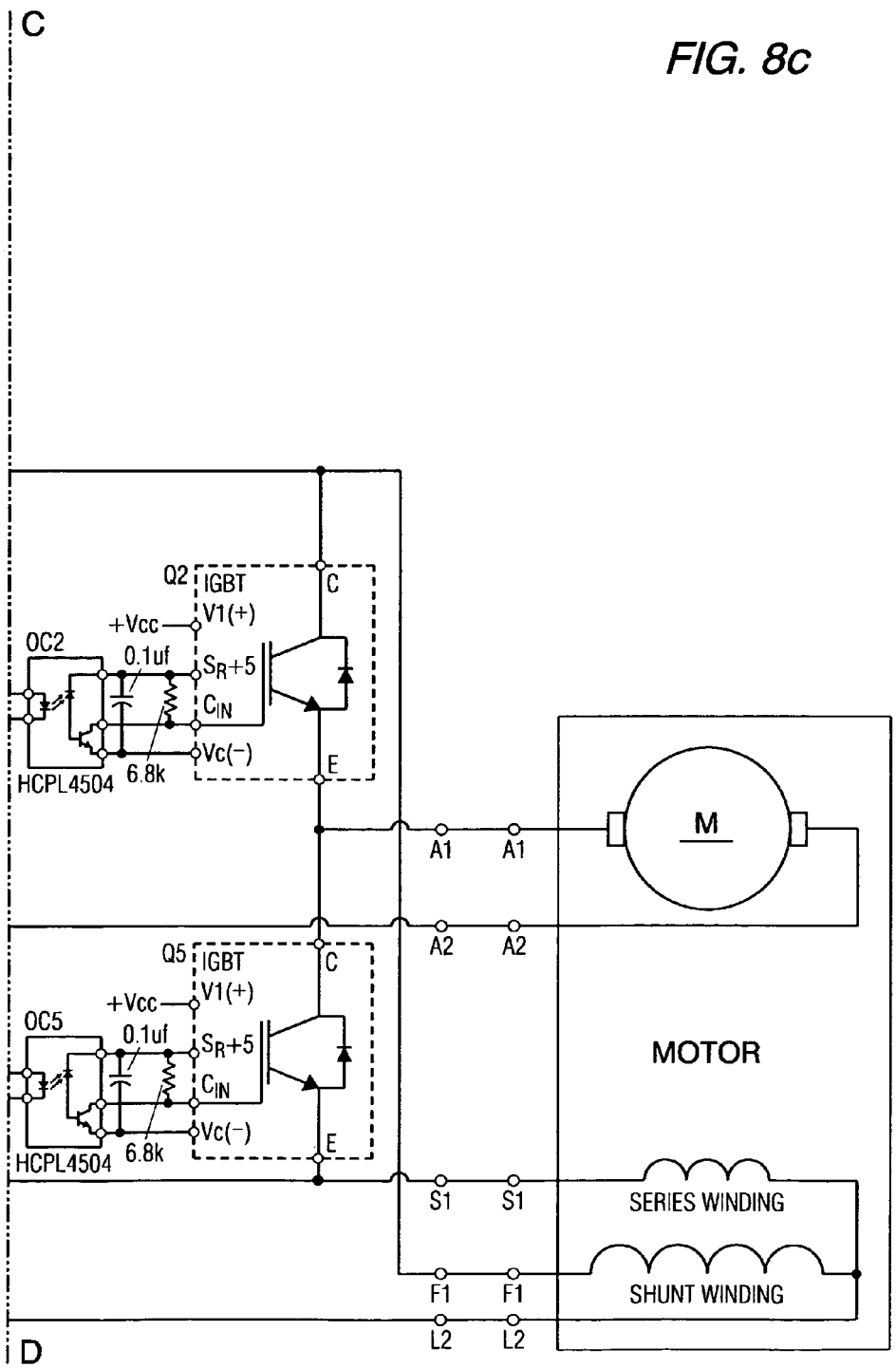

A full circuitry schematic of the preferred embodiment of this invention is illustrated in FIG. 7. The main switching component in the current limiting DC motor starter circuit illustrated in FIG. 7 is an Insulated Gate Bipolar Transistor (IGBT) device such as is available from Powerex, Inc. of Youngwood, Pa. The product family called Intelligent Power Modules combines high speed, low loss IGBT's with optimized gate drive and over-current and short-circuit protection circuitry. The device with a part number PM800HSA060 is capable of switching 800 Amps at 600 Volts.

The IGBT 24 in FIG. 7 serves as the current switch 14 previously shown in FIG. 2. Pairs of IGBT devices 26 and 28 or 30 and 32, are energized to route the armature current in one direction or the other to determine the direction of rotation of the motor (M). The control interfaces to these devices is done with HCPL4504 optocouplers 36, 38, 40 and 42, per the recommendation of the IGBT manufacturer. When IGBT 24 switches off, motor current continues to circulate through the free wheeling diode 54.

Motor current is detected using a hall effect current sensor 56, such as the Honeywell CSLA1EL, which is capable of measuring up to 625 Amps. At zero current, the output of this device is offset to Vcc/2. As the current increases so does the output voltage at about 7 mV per Amp. This voltage is compared to a fixed setpoint by comparator 58. The setpoint voltage established by the adjustable resistor voltage divided network of resistors 76, 78 and 80. The fixed resistors 76 and 80 of this network establish the range of adjustability. Resistor 82 provides a small positive feedback current to give hysteresis to the comparison.

When the measured current is less than the setpoint value, the output of the comparator 58 is high turning on transistor 74 and hence, through optocoupler 34, turning on the IGBT switch 24 allowing motor current to flow. This switching is interlocked by optocoupler 44 which is a control system input 62 to turn the motor starter on. When the current rises above the setpoint (plus hysteresis), the comparator 58 output goes low and subsequently switch 24 is turned off. The current will decay at the motor L/R time constant until it again falls below the setpoint value at which time switch 24 is once again turned on. This switching will continue, at a frequency determined by the size of the hysteresis band and the L/R time constant of the motor until such time as the EMF generated by the motor reduces the motor current to the point that the setpoint is not reached. In the simulation model used to compare this invention to conventional control approaches which produced the graphical representations identified in FIGS. 3-6, the switching frequency was found to be on the order of 30 Hz.

The control inputs to the motor starter come from a host control system as three separate signals, RUN, 62, OPEN, 64, and CLOSE, 66. The OPEN and CLOSE signals alternately turn on the pairs of armature polarity switches 26/28 or 30/32. Optocouplers 46 and 48 provide an interlock so that in the fault state where both of the inputs are turned on, all of the current steering IGBTs will be turned off preventing any motor motion. As previously mentioned, the RUN input 62 enables the main switch 24 to be turned on. By providing this signal coincidence, the potential for spurious motor operation due to control failures is reduced. Terminal 68 is the reference or return line for the control inputs. Light emitting diodes 84, 86 and 88 are provided for indication of device operation.

The control signals 62, 64 and 66 are low voltage. When the motor is not running, no voltage is present on these control lines. This provides protection against spurious motor operation that could otherwise result from cable faults (hot shorts) that may result from cable fires or other physical damage. The input voltage is set for 48 VDC by the values chosen for resistors 90, 92 and 94 that limit the current that passes through the optocouplers 44, 46 and 48, respectively. This input voltage is the voltage employed for generating the signals originating from the Components Interface Module that will be used on the AP1000 advanced nuclear power plant designed by Westinghouse Electric Company LLC, Pittsburgh Pa. However, other input voltages could be easily accommodated by selecting different values for the resistors 90, 92 and 94.

Because the switching of the armature polarity IGBT's, 26/28 and 30/32, is slow and is done at currents considerable less than their rating, external suppression, beyond that provided internally to the device, is not needed. For switch 24, the transients that could result from switching highly inductive loads such as the motor are avoided due to the free wheeling diode 54. However, because of the residual inductance in the lead from the power bus to the switch, there would be transients induced as a result of the switching. Therefore, resistor 100 and capacitor 102 are provided as a snubber circuit to suppress these transients. The manufacturers recommendation is that the time constant of the snubber be approximately three times the switching period, so it may be dependent on the specific valve motor on a case by case basis. For the fifteen horsepower sample case used in this embodiment, values of 50 kΩ and 2.0μf may be appropriate to give a time constant of 100 msec.

In addition to the short circuit protection, which could be a magnetic circuit breaker 96 as shown in the upper left hand corner of the schematic of FIG. 7, a conventional motor starter will have an overcurrent protection device which is sized based on by approximating motor temperature in a current sensitive device. The concept of such a device is to trip the circuit when a sustained current caused by an overload condition that could heat the motor windings to a point that exceeds the insulation rating. The sizing of such devices has proven to be problematic and the potential for false trips is significant. For safety related motors, the United States Nuclear Regulatory Commission has required that the action of such devices be bypassed in the event that the demand for the valve motion results from an actual safety need (RG1.106). The use of current limiting by this invention makes such a device moot. Nevertheless, it is desirable to detect overload conditions to inform the control system so that appropriate actions can be taken, including shutting off the motor if the demand is not critical. This detection is provided by a pair of 555 timer integrated circuits 104 and 106. When the comparator 58 output goes low, indicating that the current is being limited, both timer circuits 104 and 106 are triggered at inputs 108 and 110 causing their outputs 112 and 114 to go high. Timer circuit 104 is retriggered every time the comparator goes low by the discharging of the capacitor 117 through the transistor 116. The timer circuit 104 has a relativity short time out period of approximately 250 msec. The effect is that its output 112 will remain high for the duration of the time that the current is being limited by the opening of switch 24. Timer circuit 106 is not retrigger by the successive switch pulses, instead it times out after an adjustable period on the order of a few seconds. If the timer circuit 106 output becomes low at a time when the timer circuit 104 output is still high, indicating that the current limiting has persisted for longer than the preset time period, then the optocouplers 50 and 52 conduct, causing timer circuit 106 to reset preventing it from responding to further triggering pulses, so long as the optocouplers 50 and 52 are conducting, and at the same time signaling the overcurrent condition to the control system through optocoupler outputs 124. The timer circuit 106 resets when the current limiting stops by allowing timer circuit 104 to time out and its output 112 go low.

The sensitively of the hall effect current sensor 56 is dependent to an extent on the geometry of the wire carrying the motor current passing through it and the coupling of the magnetic field produced by the current to the core of the toroid of the sensor. For this reason, calibration features are provided to allow the current limiting to be precisely set in situ. A multiple turn winding 122 through the aperture of the current sensor 56 is brought out to test points TP1 and TP2. By injecting a known current source through this winding, the output voltage of the sensor 56 can be measured at test point (TP4). The ratio of turns of the calibration winding to the single turn of the motor circuit provides a multiplier from which a calibration curve can be determined. The calibration curve thus determined is used to determine the setpoint, which is then dialed in while measuring its value on TP3. Since the comparator 58 will be on during this procedure (since the motor current is zero) the voltage at TP3 will include the hysteresis value and will thus be a true measure of the point at which the current will be switched off. The function of the comparator 58 and the value of the hysteresis can then be determined by varying the calibration current (multiplied by the winding ratio factor) above and below the action values and observing the resulting voltage changes on TP5.

Accordingly, this invention provides a current limiting DC motor starter with precise current control that adapts to changing conditions and provides overcurrent indication to the control system as well as features to enable its calibration. Additionally, the interface to the control system is arranged in such a manner that cable faults and other single failures will not cause spurious actuation of the motor.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breath of the appended claims and any all equivalents thereof.

What is claimed is:

1. A current limiting DC Motor Starter comprising:
    a switching mode current regulator having a source input terminal for connecting a source of DC current, the source input terminal is connected through a switching circuit to a motor output terminal, the switching circuit maintaining the current below a preselected maximum current; and
    a solid state reversing motor starter having an input in series with the switching mode current regulator motor output terminal, the solid state reversing motor starter having a circuit for reversing the polarity of a winding of a DC motor and an output connectable to the winding of the DC motor.

2. The current limiting DC Motor Starter of claim 1 wherein the switching circuit comprises:
    a switch in series with the source input terminal, the switch having a switch control circuit operable to open the switch when the current through the switch exceeds a first predetermined value and to close the switch when the current downstream of the switch falls below a second predetermined value;
    a diode placed across the motor output terminal between the motor winding and the switch, the diode being oriented to block current from the source of DC current connected through the source input terminal, from circulating through the diode; and
    a current sensor for monitoring the current through the motor winding and providing an output representative thereof to the switch control circuit.

3. The current limiting DC Motor Starter of claim 2 wherein the switch comprises an Insulated Gate Bipolar Transistor.

4. The current limiting DC Motor Starter of claim 2 wherein the second predetermined value takes into account the hysteresis in the series circuit.

5. A current limiting DC Motor Starter comprising:
    a switching mode current regulator having a source input terminal for connecting a source of DC current, the source input terminal is connected through a switching circuit to a motor output terminal, the switching circuit comprising;
        a switch in series with the source input terminal, the switch having a switch control circuit operable to open the switch when the current through the switch exceeds a first predetermined value and to close the switch when the current downstream of the switch falls below a second predetermined value, the motor output terminal connectable to a DC motor winding in series with the switch;
        a diode placed across the motor output terminal between the motor winding and the switch, the diode being oriented to block current from the source of DC current connected through the source input terminal, from circulating through the diode; and
        a current sensor for monitoring the current through the motor winding and providing an output representative thereof to the switch control circuit; and
    a solid state reversing motor starter having an input in series with the switching mode current regulator motor output terminal, the solid state reversing motor starter having a circuit for reversing the polarity of the winding of the DC motor and an output connectable to the winding of the DC motor;
    the current limiting DC Motor Starter further including three control input terminals to DC Motor Starter comprising:
    a first control input terminal for activating or deactivating the switching mode current regulator;
    a second control input terminal which connects or disconnects a polarity of an armature of the motor so that when connected will cause the armature to turn in a first direction; and a third control input terminal which connects or disconnects the polarity of the armature of the motor so that when connected will cause the armature to turn in a second direction.

6. The current limiting DC Motor Starter of claim 5 wherein when the motor is not running no voltage is present at the three control input terminals.

7. The current limiting DC Motor Starter of claim 2 including an overcurrent protection device that monitors a state of the switch and provides an output to a motor control center when the switch remains in an open state for greater than a first preselected time interval.

8. A current limiting DC Motor Starter comprising:
a switching mode current regulator having a source input terminal for connecting a source of DC current, the source input terminal is connected through a switching circuit to a motor output terminal, the switching circuit comprising;
 a switch in series with the source input terminal, the switch having a switch control circuit operable to open the switch when the current through the switch exceeds a first predetermined value and to close the switch when the current downstream of the switch falls below a second predetermined value, the motor output terminal connectable to a DC motor winding in series with the switch;
 a diode placed across the motor output terminal between the motor winding and the switch, the diode being oriented to block current from the source of DC current connected through the source input terminal, from circulating through the diode; and
 a current sensor for monitoring the current through the motor winding and providing an output representative thereof to the switch control circuit; and a solid state reversing motor starter having an input in series with the switching mode current regulator motor output terminal, the solid state reversing motor starter having a circuit for reversing the polarity of the winding of the DC motor and an output connectable to the winding of the DC motor;

the current limiting DC Motor Starter further including an overcurrent protection device that monitors a state of the switch and provides an output to a motor control center when the switch remains in an open state for greater than a first preselected time interval, the overcurrent protection device comprising:

a first timing circuit that is retriggered every time the switch is opened to provide a first given output for at least a second preselected time interval substantially equal to the time the switch will remain open under a normal startup condition, wherein the first preselected time interval is substantially longer than the second preselected time interval and the second preselected time interval is reset every time the first timing circuit is retriggered;

a second timing circuit that is triggered when the switch is opened to provide a second given output for the first preselected time interval and is not retriggered by subsequent openings of the switch until the first preselected time interval has timed out; and a comparison circuit that monitors the first given output and the second given output and provides a third output to the motor control center when the comparison circuit senses that the second given output is not present when the first given output is detected.

* * * * *